United States Patent
Kapels

(10) Patent No.: US 6,789,829 B1
(45) Date of Patent: Sep. 14, 2004

(54) LIFT AND DUMP BED

(76) Inventor: Cory S. Kapels, 5468 19th Ave., Columbus, NE (US) 68601

( * ) Notice: Subject to any disclaimer, the term of this patent is extended or adjusted under 35 U.S.C. 154(b) by 0 days.

(21) Appl. No.: 10/377,867

(22) Filed: Feb. 28, 2003

(51) Int. Cl.[7] .......................... B62D 33/02; B65G 67/24
(52) U.S. Cl. .................... 296/11; 296/183.2; 298/19 R
(58) Field of Search ............................... 296/11, 183.2, 296/184; 298/17 R, 19 R, 22 R, 22 J, 22 P, 22 D, 17 SG

(56) References Cited

U.S. PATENT DOCUMENTS

| | | | |
|---|---|---|---|
| 1,012,203 A | 12/1911 | Hunt | |
| 2,471,901 A | 5/1949 | Ross | ............................... 254/9 |
| 2,501,001 A | 3/1950 | Neely | .......................... 254/122 |
| 2,899,172 A * | 8/1959 | Cresci | ........................ 254/8 C |
| 3,036,865 A * | 5/1962 | Stone | ........................... 298/11 |
| 3,619,007 A * | 11/1971 | Phillips | ....................... 414/471 |
| 3,784,162 A | 1/1974 | Channell et al. | ............ 254/124 |
| 3,891,108 A | 6/1975 | Traficant | ..................... 214/512 |
| 3,902,616 A | 9/1975 | Santic et al. | ................. 214/313 |
| 4,019,781 A | 4/1977 | Ray | .......................... 298/22 J |
| 4,168,861 A | 9/1979 | Carroll | ....................... 298/22 J |
| 4,221,280 A | 9/1980 | Richards | ....................... 187/18 |
| 4,403,680 A | 9/1983 | Hillesheimer | ................ 187/18 |
| 4,568,028 A * | 2/1986 | Verseef et al. | .............. 239/657 |
| D307,814 S | 5/1990 | Kawana | ....................... D34/31 |
| 5,074,622 A | 12/1991 | Channell | .................... 298/22 J |
| 6,186,596 B1 * | 2/2001 | Jones | ........................ 298/19 B |

FOREIGN PATENT DOCUMENTS

JP         354035916 A   *   3/1979   ............... 298/19 R

* cited by examiner

Primary Examiner—D. Glenn Dayoan
Assistant Examiner—H. Gutman
(74) Attorney, Agent, or Firm—Thomte, Mazour & Niebergall; Dennis L. Thomte

(57) ABSTRACT

A lift and dump bed is movably mounted on a wheeled frame such as a trailer or truck with the dump bed being pivotally movable to a dumping position or horizontally raised to a lift position.

7 Claims, 7 Drawing Sheets

LIFT AND DUMP BED

BACKGROUND OF THE INVENTION

1. Field of the Invention

This invention relates to a lift and dump bed or box which is movably mounted on a wheeled frame such as a trailer or truck.

2. Description of the Related Art

Dump beds or boxes have been used on trailers and trucks for many years. See, for example, U.S. Pat. Nos. 3,784,162; 4,019,781; 4,168,861; and 5,074,622. In the conventional dump boxes, the box or bed is pivotally secured adjacent its rearward end to the rearward end of the truck or trailer frame with one or more hydraulic cylinders being utilized to pivot the box from a horizontally disposed non-dumping position to an inclined dumping position. In the dumping position, the forward end of the box is elevated above the rearward end of the box to dump materials from the rearward end of the box.

There are certain situations where it would be advantageous if the box could be raised in a horizontal fashion from its horizontally disposed non-dumping position to elevate objects or to provide an elevated work platform. However, the same is not possible with the conventional dump boxes due to their pivotal connection to the frame of the truck or trailer.

Devices are described in the prior art wherein a work platform or the like may be moved between a horizontally disposed lower position to a horizontally disposed elevated position. Further, certain of the prior art devices also have the ability to be tilted. See, for example, U.S. Pat. Nos. 2,203,059; 3,902,616; 4,221,280; and 4,403,680. However, it is believed that the prior art devices identified above are very expensive to manufacture and are very complicated in design.

SUMMARY OF THE INVENTION

A lift and dump bed or box is described which is movably mounted on a wheeled frame such as a trailer or truck. In the invention described herein, the bed is selectively pivotally secured, adjacent its rearward end, to the rearward end of the frame and has a hydraulic cylinder or cylinders secured thereto to enable the bed to be pivotally raised from a lower horizontally disposed position to a dumping position upon the extension of the hydraulic cylinder of cylinders. The invention also includes first, second, third and fourth elongated scissor arms having forward and rearward ends. The first and second scissor arms are pivotally connected, intermediate the lengths thereof, to the third and fourth scissor arms, respectively, intermediate the lengths thereof. The rearward ends of the first and second scissor arms are in selective movable engagement with the bed while the rearward ends of the third and fourth scissor arms are in selective movable engagement with the frame. The forward ends of the first and second scissor arms are pivotally secured to the frame adjacent the forward end thereof. The forward ends of the third and fourth scissor arms are selectively pivotally secured to the bed whereby the bed will be horizontally raised from its lower horizontally disposed position to an upper horizontally disposed lift position when the forward ends of the third and fourth scissor arms are selectively pivotally connected to the bed while the rearward end of the bed is pivotally disconnected from the frame and upon the hydraulic cylinder or cylinders being extended. Thus, the bed may be either pivotally moved to a dumping position or may be horizontally raised to a lift position.

It is therefore a principal object of the invention to provide an improved lift and dump bed.

A further object of the invention is to provide an improved lift and dump bed which is movably mounted on a wheeled frame such as a trailer or truck.

Still another object of the invention is to provide a simplified lift and dump bed which is movably mounted on a wheeled frame such as a trailer or truck.

Yet another object of the invention is to provide a lift and dump bed which is easily adapted to be either dumped or raised to a lift position.

Yet another object of the invention is to provide a lift and dump bed which is safe to use.

Still another object of the invention is to provide a lift and dump bed which is durable in use.

These and other objects will be apparent to those skilled in the art.

DESCRIPTION OF THE PREFERRED EMBODIMENT

Figure 1:
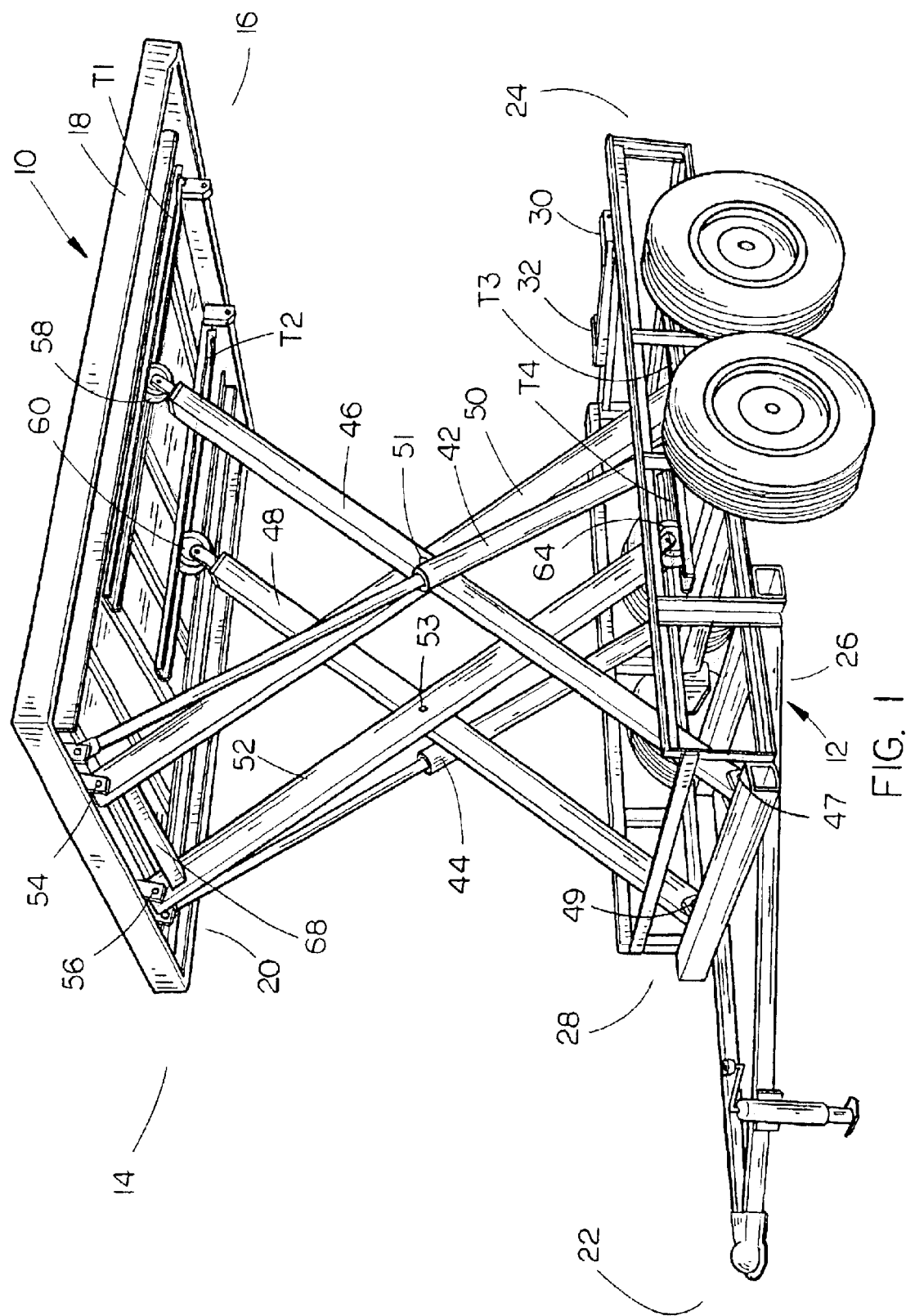
FIG. 1 is a perspective view illustrating the bed of this invention in a lift position.

The dump bed or box of this invention is referred to generally by the reference numeral 10 and is designed to be mounted on a wheeled frame 12 such as a truck or trailer. For purposes of description, bed 10 will be described as having a forward end 14, rearward end 16, and opposite sides 18 and 20. For purposes of description, wheeled frame 12 will be described as having a forward end 22, rearward end 24, and opposite sides 26 and 28.

A pair of rearwardly extending supports 30 and 32 are secured to the rearward end of the frame 12, as seen in the drawings. The underside of bed 10 has a pair of pivot brackets 34 and 36 provided thereon which are adapted to be selectively pivotally secured to the rearward ends of the supports 30 and 32 by removable pins 38 and 40, respectively. The underside of bed 10 is also provided with a pair of longitudinally extending tracks or channels T1 and T2 provided thereon for a purpose to be described hereinafter.

A pair of extendible power cylinders 42 and 44 are pivotally connected at their base ends to frame 12 rearwardly of the forward end thereof, The rod ends of power cylinders 42 and 44 are pivotally connected to the bed 10 adjacent the forward end thereof. (FIG. 1). Preferably, the power cylinders are hydraulic cylinders and any number of hydraulic cylinders could be utilized for dumping and lifting the bed.

First and second scissor arms 46 and 48 are pivotally connected at their forward ends to the forward end of frame 12 at 47 and 49, respectively. (FIG. 1). Third and fourth scissor arms 50 and 52 are pivotally connected intermediate their lengths to scissor arms 46 and 48, respectively, at 51 and 53, respectively, intermediate the lengths thereof. The forward ends of scissor arms 50 and 52 are selectively removably pivotally connected to the bed 10 by the pins 54 and 56, respectively. It should be noted that the pins 38 and 40, when removed from the pivot brackets 34 and 36, respectively, could be used as a substitute for the pins 54 and 56, respectively. Rollers 58 and 60 are rotatably mounted on the rearward ends of scissor arms 46 and 48, respectively, while roller 64 and 66 are rotatably mounted on the rearward ends of scissor arms 50 and 52, respectively. Rollers 58 and 60, which are mounted oh scissor arms 46 and 48, respectively, are adapted to engage the tracks T1 and T2, respectively. (FIG. 1). Similarly, the rollers 64 and 66 are adapted to selectively engage tracks or channels T3 and T4 which extend longitudinally and which are secured to the frame 12, as seen in the drawings. Although the use of rollers is preferred, the rollers could be replaced by friction pads, slides, etc. As seen in the drawings, cross-tube 68 is secured to and extends between scissor arms 50 and 52.

Figure 2:
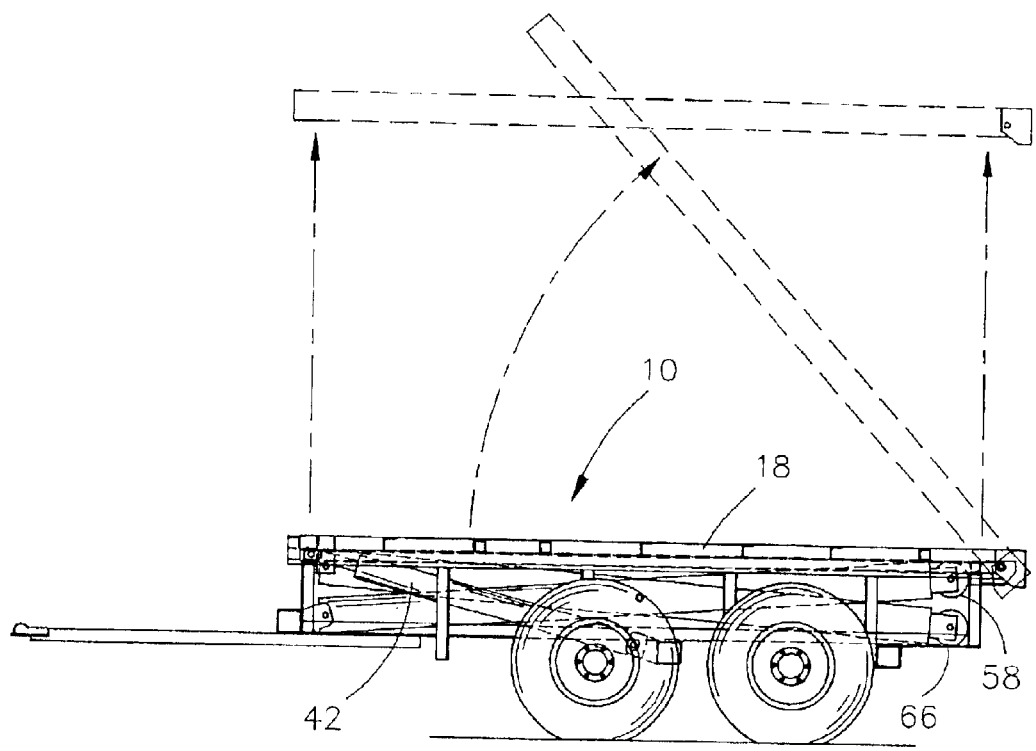
FIG. 2 is a side elevational view illustrating the bed in a horizontal position with the broken lines illustrating the bed positioned in a dumping position and in a lift position.
Figure 3:
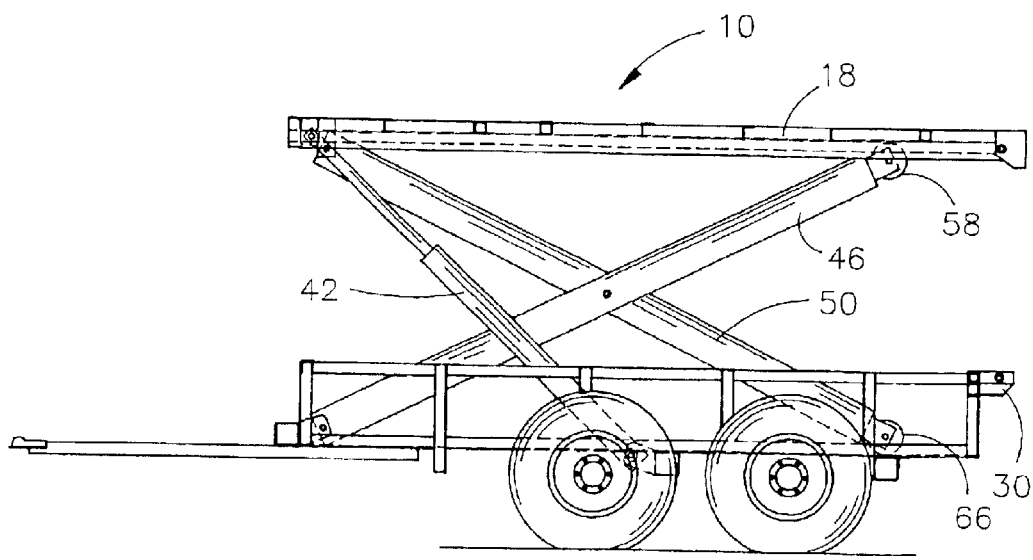
FIG. 3 is a side view illustrating the bed of this invention in its lift position.
Figure 4:
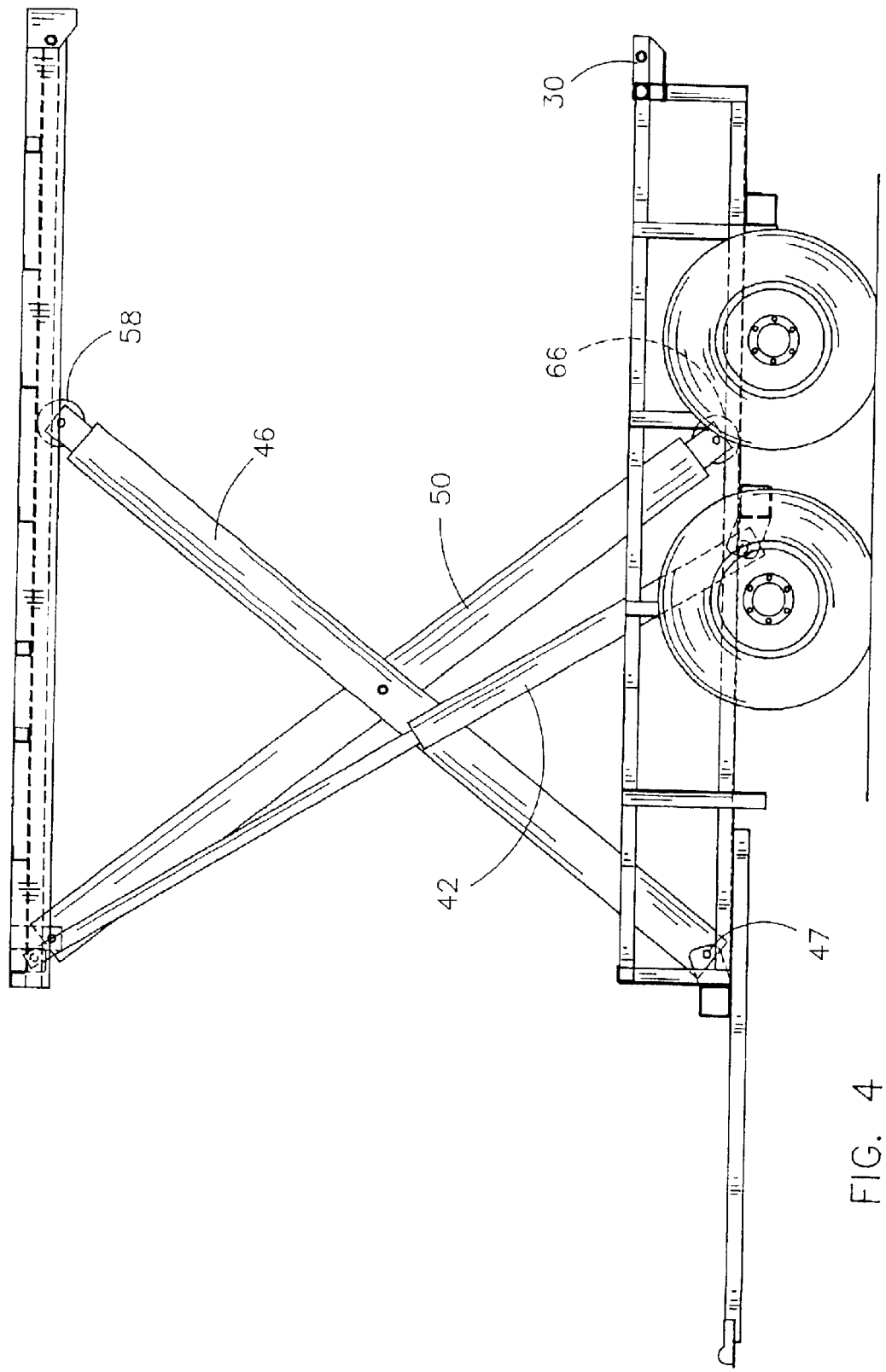
FIG. 4 is a side view illustrating the bed in its lift position.
Figure 5:
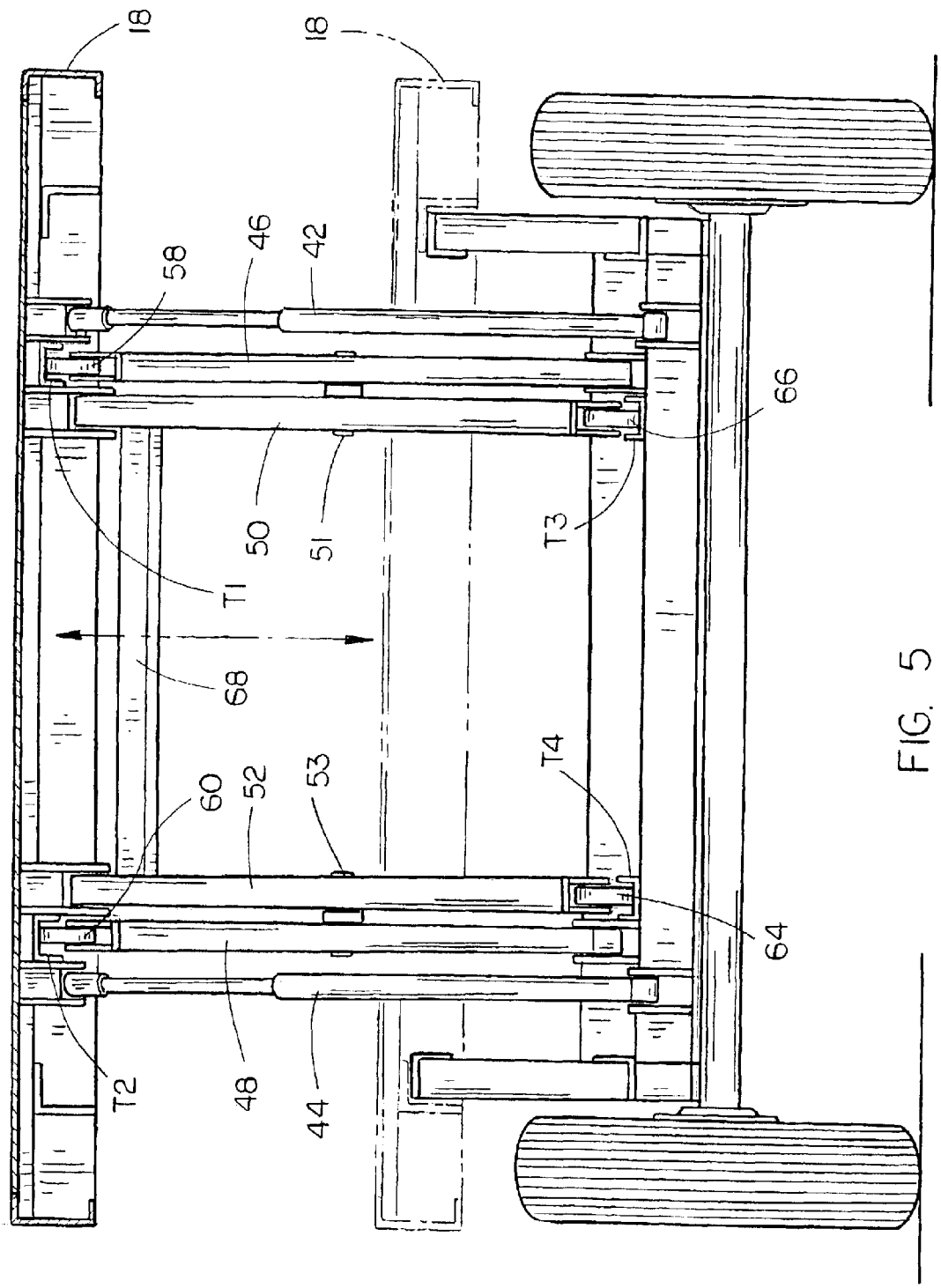
FIG. 5 is rear view of the bed in its lift position with the broken lines illustrating the bed in its lowered position.
Figure 6:
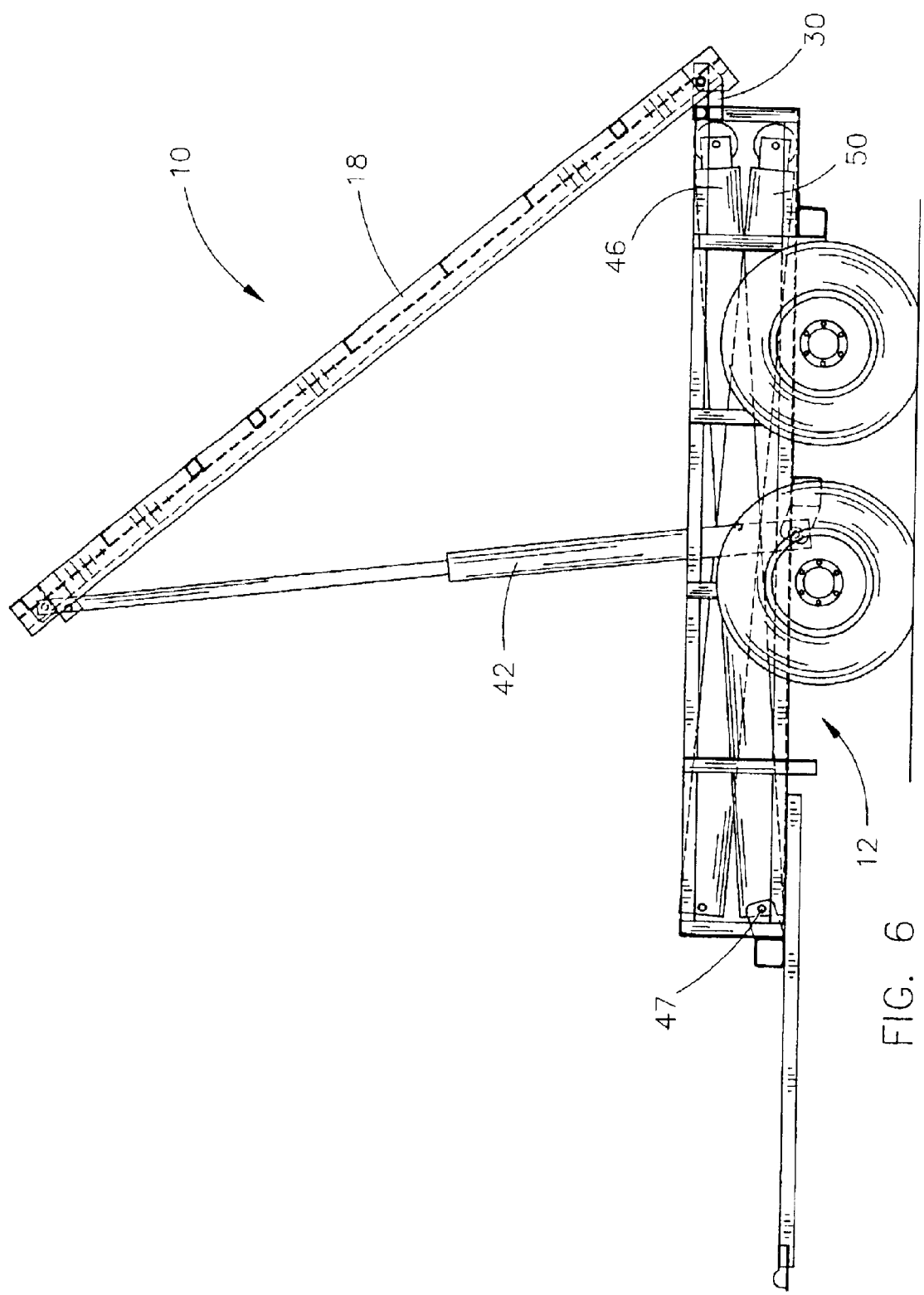
FIG. 6 is a side view illustrating the bed in its dumping position.
Figure 7:
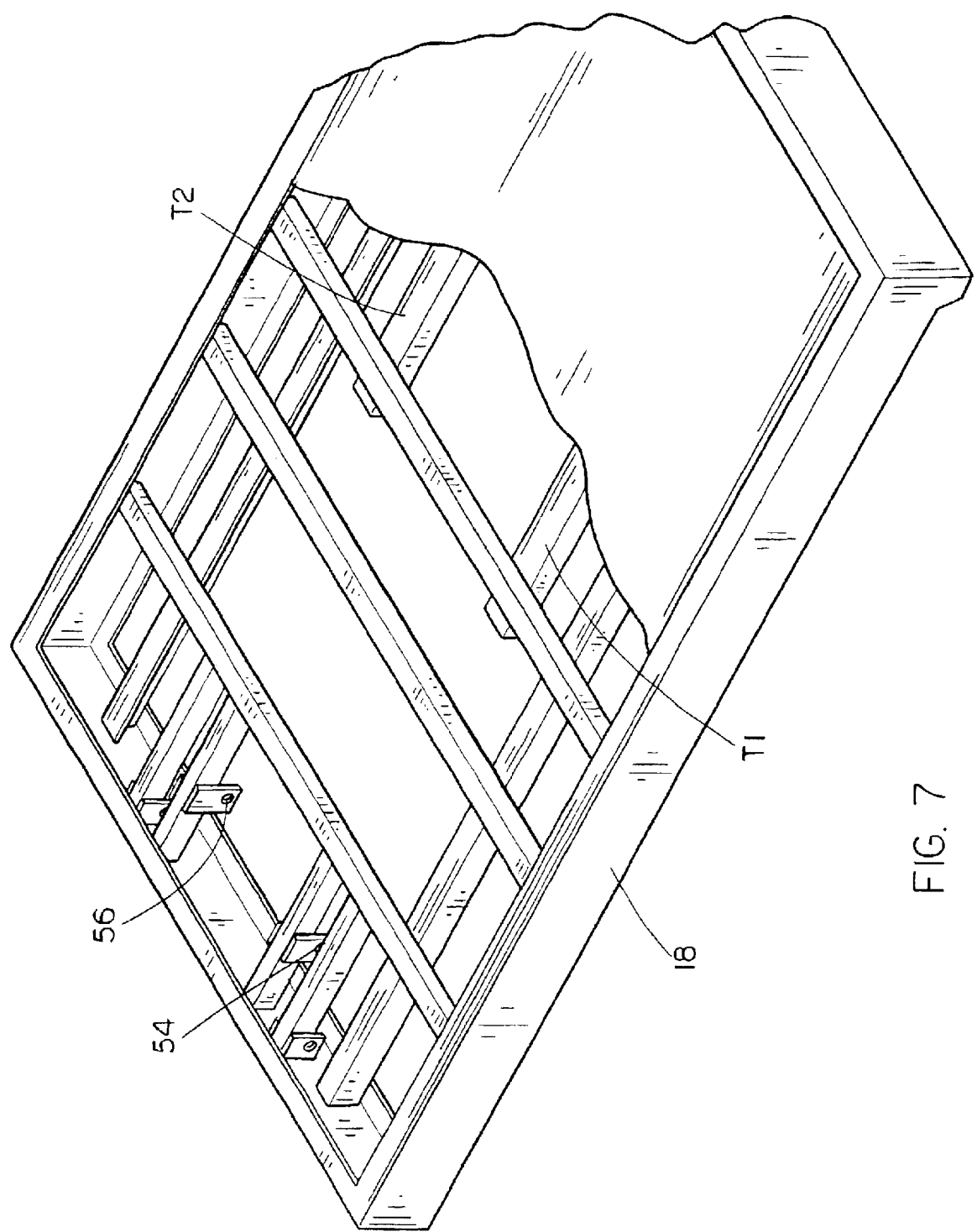
FIG. 7 is a partial perspective view of the bed of this invention with portions thereof cut away to more fully illustrate the invention.
Figure 8:
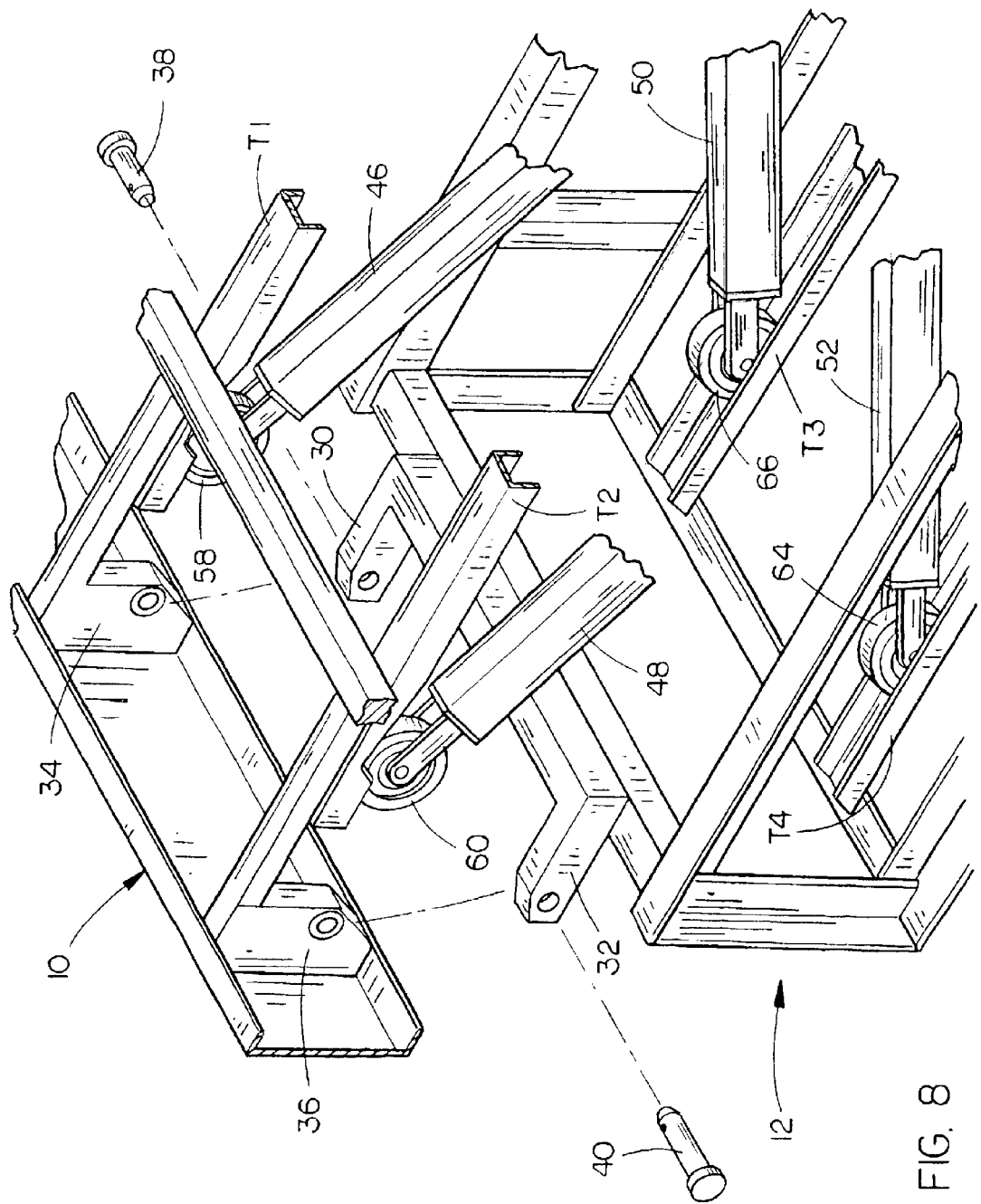
FIG. 8 is a partial exploded perspective view illustrating the rearward end of the bed and its connection to the frame.

If the bed 10 is going to be used as a dump bed or box, the pins 54 and 56 are removed so that scissor arms 50 and 52 are not pivotally connected to the bed 10. The pins 38 and 40 will be installed to connect the pivot brackets 34 and 36 to the supports 30 and 32. With the pins 38 and 40 installed and the pins 54 and 56 removed, extension of the hydraulic cylinders 42 and 44 causes the bed to be pivotally moved from its lower horizontally disposed position of FIG. 2 to its dumping position wherein the forward end of the bed 10 is elevated above the rearward end of the bed 10 (FIG. 2) so that materials in the bed may be dumped therefrom. During the dumping operation, the scissor arms 46, 48, 50 and 52 are inoperative.

When it is desired to use the bed as a lift bed, pivot brackets 34 and 36 are disconnected from the supports 30 and 32 by removing the pins 38 and 40 therefrom. The pins 54 and 56 are then utilized to pivotally connect the forward ends of the scissor arms 50 and 52 to the forward end of the bed 10. As stated before, the pins 38 and 40 are interchangeable with the pins 54 and 56 which means that only a single pair of pins is required since only one pair of pins is utilized at a time. With the forward ends of scissor arms 50 and 52 pivotally connected to the forward end of the bed 10, extension of the hydraulic cylinders 42 and 44 causes the bed to be moved in a horizontally disposed fashion from its lower horizontally disposed position to its upper horizontally disposed position, as seen in the drawings. While the bed 10 is being raised, the rollers 58 and 60 on the scissor arms 46 and 48, respectively, roll in the tracks T1 and T2. At the same time, the rollers 64 and 66 on the rearward ends of scissor arms 50 and 52, respectively, roll in the tracks T3 and T4. Engagement of the rollers on the scissor arms with the tracks provides a smooth operation and adds stability to the device.

The structure shown and described herein is extremely simple in construction and very durable in use. The bed herein can be used as a dump bed or as a lift bed simply through the use of pins which either connect the rearward end of the bed 10 to the frame or which connect the forward ends of scissor arms 50 and 52 to the bed.

Thus it can be seen that a novel lift and dump bed or box has been provided which accomplishes at least all of its stated objectives.

I claim:
1. In combination:
   a wheeled frame having a forward end, a rearward end, and first and second sides;
   a bed having a forward end, a rearward end, and first and second sides;
   at least one extendible power cylinder having a base end and a rod end;
   said base end of said power cylinder being pivotally secured to said wheeled frame forwardly of the rearward end thereof;
   said rod end of said power cylinder being pivotally secured to said bed;
   said bed being selectively pivotally secured, adjacent its rearward end, to said rearward end of said wheeled frame whereby said bed may be pivotally raised from a lower horizontally disposed position to a dumping position upon the extension of said power cylinder;
   first and second elongated scissor arms having forward and rearward ends;
   third and fourth elongated scissor arms having forward and rearward ends;
   said first and second scissor arms being pivotally connected, intermediate the lengths thereof, to said third and fourth scissor arms, respectively, intermediate the lengths thereof;
   said rearward ends of said first and second scissor arms being in selective movable engagement with said bed;
   said rearward ends of said third and fourth scissor arms being in selective movable engagement with said frame;
   said forward ends of said first and second scissor arms being pivotally secured to said frame;
   said forward ends of said third and fourth scissor arms being selectively pivotally secured to said bed whereby said bed will be horizontally raised from its lower horizontally disposed position to an upper horizontally disposed lift position when said forward ends of said third and fourth scissor arms are selectively pivotally connected to said bed while said rearward end of said bed is pivotally disconnected from said frame and said power cylinder is extended;
   said at least one extendible cower cylinder being generally horizontally disposed when said bed is in said lower horizontal position.
2. The combination of claim 1 wherein each of said rearward ends of said first, second, third and fourth scissor arms have rollers mounted thereon.
3. The combination of claim 2 wherein said bed has an underside and wherein first and second elongated tracks are secured to said underside of said bed which selectively receive the rollers on the rearward ends of said first and second scissor arms, respectively; said wheeled frame having third and fourth elongated tracks provided thereon which selectively receive the rollers on the rearward ends of said third and fourth scissor arms, respectively.
4. The combination of claim 1 wherein said power cylinder comprises a hydraulic cylinder.
5. The combination of claim 4 wherein a pair of hydraulic cylinders are provided.
6. The combination of claim 1 wherein said forward ends of said first and second scissor arms are pivotally secured to said frame adjacent the forward end thereof.
7. The combination of claim 1 wherein said rod end of said power cylinder is pivotally secured to said bed adjacent the forward end thereof.

* * * * *